Sept. 10, 1935. C. HAHN 2,013,753
PURIFICATION OF GASES DERIVED FROM ROASTING
Filed April 21, 1932
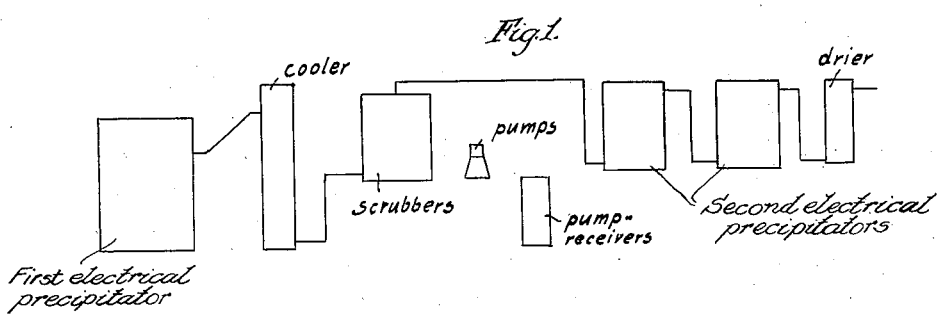
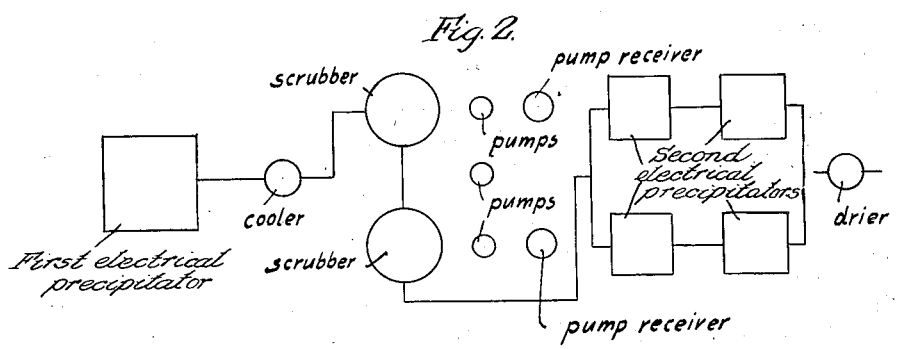
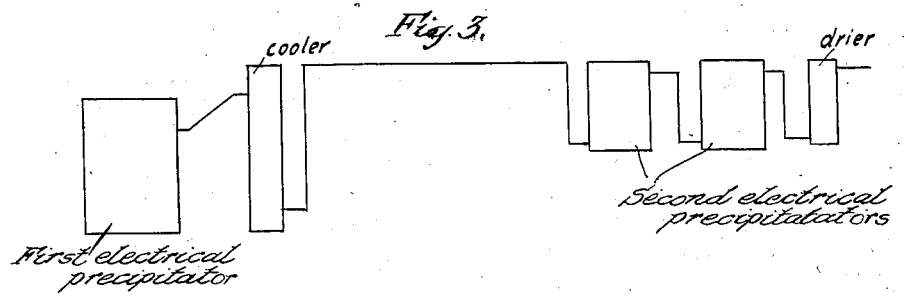
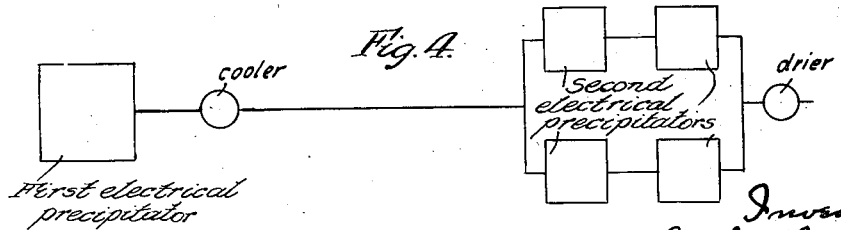

Patented Sept. 10, 1935

2,013,753

UNITED STATES PATENT OFFICE 2,013,753

PURIFICATION OF GASES DERIVED FROM ROASTING

Carl Hahn, Leverkusen, Germany, assignor to I. G. Farbenindustrie Aktiengesellschaft, Frankfort-on-the-Main, Germany Application April 21, 1932, Serial No. 606,741 In Germany May 1, 1931

2 Claims. (Cl. 23—178)

The present invention relates to a new process of purifying sulfur dioxide containing gases derived from roasting and essentially consists in purifying the crude gases in a two stage process, the first of which is to remove the dust and the second of which is to remove all other impurities in a high tension plant by spraying in water.

The purification of gases derived from roasting pyrites and other sulfide ores was effected up to the present time in a very complicated manner. The hot gases from the roasting furnace having in general a temperature above 300° C. are freed from dust in an electrical precipitator. Thereby only the dust is eliminated, but the sulfuric acid fog and all other impurities cannot be removed on account of the high temperature. The sulfuric acid is then removed by washing the gases at a temperature of about 20–80° C., preferably between 30 and 50° C., with water and subjecting the moist gases to a second electric filtration treatment in a second electrical precipitator, whereby also selenium, arsenic and other impurities are removed. Thereby a dilute sulfuric acid is obtained the disposal of which is generally rather difficult. The apparatus for this process consists of several towers, pumps and pump receivers. Thus the erection of the plant and the working thereof involve considerable expense.

In accordance with the present invention the purification of $SO_2$ roaster gases is considerably simplified in the following manner:

The gases having a temperature above 300° C. derived from the roasting furnace are freed from dust in the manner described above by electric filtration in an electrical precipitator. Then the gases are cooled to a temperature below 100° C., for instance, 20–80° C., and are subjected to a second electric filtration in an electrical precipitator into which water is sprayed by appropriate means, for instance through nozzles, preferably in a quantity at least sufficient to combine with the sulfur trioxide and the sulfuric acid fog present in the gases to form sulfuric acid. By this treatment not only the sulfuric acid fog and the sulfur but also all other impurities, such as arsenic and selenium, are removed from the gases. The sulfuric acid containing all the impurities is obtained in a relatively concentrated form, so that no evaporation is necessary.

Furthermore the improved process does not give rise to obstructions or clogging since in the whole process no exposed apparatus is employed. It follows that the draught is satisfactory in every way. A further advantage consists in the fact that the quantity of water to be added can be regulated, while the moisture given off in the towers is dependent on the temperature of the gases and consequently cannot be regulated. The new method of working is considerably cheaper than the old one as regards plant and operation expenses, especially since a second electrical precipitator of the same size as that hitherto used completely suffices to meet the modified requirements. As regards the purity of the gases the new process is in no way inferior to the old one.

In the annexed drawing the old method and the new one are illustrated. Figures I and II illustrate the known purification processes. Figures III and IV illustrate the new method of working. As will be seen from Figures III and IV the apparatus parts, comprising the scrubbers, the pumps and the pump receivers, are not required in the new process contrary to the known processes illustrated in Figures I and II. The sprayed water is introduced into the second electrical precipitator. The second electrical precipitators are in both cases of equal size when charged with the same quantity.

I claim:—

1. Process of purifying $SO_2$ roaster gases, consisting in subjecting the gases derived from the roasting furnace at a temperature above 300° C. to an electric filtration by means of an electrical precipitator, cooling the gases to a temperature below 100° C. and subjecting the gases to a second electric filtration in an electrical precipitator into which water is sprayed while the gases are treated therein.

2. Process of purifying $SO_2$ roaster gases, consisting in subjecting the gases derived from the roasting furnace at a temperature above 300° C. to an electric filtration by means of an electrical precipitator, cooling the gases to a temperature below 100° C. and subjecting the gases to a second electric filtration in an electrical precipitator into which water is sprayed, while the gases are treated therein in a quantity which is at least sufficient to combine with the sulfur trioxide and the sulfuric acid fog to produce a concentrated sulfuric acid.

CARL HAHN.